United States Patent [19]

Saito

[11] 4,007,411
[45] Feb. 8, 1977

[54] CUTTING FEED STARTING POSITION CONTROL DEVICE FOR MACHINE

[75] Inventor: Kojiro Saito, Showa, Japan

[73] Assignees: Yutaka Seimitsu Kogyo Ltd., Yono; Toyota Jidosha Kogyo Kabushiki Kaisha, Toyota, both of Japan

[22] Filed: Sept. 19, 1974

[21] Appl. No.: 507,552

[30] Foreign Application Priority Data

Sept. 19, 1973 Japan .............................. 48-105565
Sept. 19, 1973 Japan .............................. 48-105566

[52] U.S. Cl. .............................. 318/630; 318/572; 318/467
[51] Int. Cl.² ......................................... G05B 11/01
[58] Field of Search .................... 318/572, 630, 467

[56] References Cited

UNITED STATES PATENTS

| | | | |
|---|---|---|---|
| 2,537,083 | 1/1951 | Peoples, Jr. .................. | 318/630 |
| 3,343,053 | 9/1967 | Toscano et al. ................ | 318/572 |
| 3,628,002 | 12/1971 | Meese et al. ................... | 318/572 X |
| 3,704,641 | 12/1972 | Rhoades ....................... | 318/572 X |
| 3,754,178 | 8/1973 | Durmehl et al. ................ | 318/572 |
| 3,764,786 | 10/1973 | Vanter et al. ................. | 318/572 X |
| 3,840,792 | 10/1974 | Yokoe .......................... | 318/572 |

*Primary Examiner*—James R. Scott
*Assistant Examiner*—John J. Feldhaus
*Attorney, Agent, or Firm*—Silverman & Cass, Ltd.

[57] ABSTRACT

A cutting feed starting position control device for machine tools is capable of automatically shifting a cutting feed starting position in the machine tool toward a work a distance corresponding to a variation in size of a tool such as a grinding wheel due to dressing or truing, and again returning the shifted cutting feed starting position to an original position when it is desired such as a replacement of wheels, thereby completely removing various kinds of difficulties in a numerical machine tool control due to the variation in size of tools.

2 Claims, 9 Drawing Figures

FIG_1

FIG_2

FIG_3

FIG_7

CUTTING FEED STARTING POSITION CONTROL DEVICE FOR MACHINE

BACKGROUND OF THE INVENTION

1. Field of the Invention

This invention relates to a cutting feed starting position control device for numerically controlled machine tools such as grinding machines, milling machines and lathes, which is adapted to shift a starting position of a tool such as a grinding wheel or milling cutter responsively to a variation in size of the tool due to a regrinding of the tool as dressing or truing, and return the moved starting position to an original position when it is desired such as a change of grinding wheels.

2. Description of the Prior Art

Numerically controlled grinding machines have been widely used in machining shops. In the prior art numerical grinding machine control, an arithmetic unit is necessary for compensating a depth of cut due to a reduction in diameter of a grinding wheel whenever it is dressed or trued. Such a compensating unit however is complicated and high expensive. Moreover, the reduction in diameter of the tool each time of dressing or truing results in an extension of a cycle time of the operation. If an electric current is stopped in working operation of a machine for an emergency or unintentional reason, numerical control means is instantaneously brought into a reset condition which makes it difficult to restore the means to its original condition. In addition, when the numerical control means is supplied with electric current, a pulse motor in the apparatus rotates, at the most, pulses corresponding to one half of its pole number in a normal or reverse direction without receiving any information owing to an excitation phase shift phenomenon which occurs in a numerical control apparatus, and the undue rotation of the pulse motor results in a cumulative error which affects the operation of the machine till the last. In the prior art numerical control, a returning of moving parts to an original position is carried out by reading a preset value which has been preset for quick and cutting feeds, so that there is a problem how to remove a back-lash of the moving parts because the direction of the returning is opposite to that of the preceding feed. Furthermore any error in a preset feed or in a feed in an opposite direction by reading will become a cumulative error.

SUMMARY OF THE INVENTION

In order to overcome the above disadvantages in the prior art, the device according to the invention comprises a movable original position mechanism shifting a feed starting position of said tool each time of its regrinding in its cutting forward direction a distance corresponding to a variation in size of said tool due to the regrinding.

In other aspect of the invention the device comprises magnetic switch means consisting of two parts, said one part mounted on said stationary part at a starting position of said moving part and the other part mounted on said moving part, whereby said moving part is returned to said starting position by utilizing a difference between output voltage curves of said switch means resulting from a difference in direction of movement of the part due to a hysteresis of said switch means.

It is an object of the invention to provide an improved cutting feed starting position control device for machine tools which is capable of shifting a cutting feed starting position toward a work correspondingly to a variation in size of a tool due to dressing or truing to keep constant a relationship between the surfaces of the tool and work without any extension of cycle times due to reductions in size of the tool.

It is another object of the invention to provide an improved cutting feed starting position control device utilizing the hysteresis of magnetic switches at "ON" and "OFF" positions for removal of back-lash of moving parts so that the returning to an original position can be carried out with an accuracy of ±0.001 mm without using any arithmetic unit for compensation.

It is further object of the invention to provide an improved cutting feed starting position control device capable of effecting a return to an original or moved original position with ease even if an electric current is stopped in working operation of a machine for an emergency or unintentional reason, and again carrying out the working operation when an electric current is again supplied.

It is another object of the invention to provide an improved cutting feed starting position control device in which if there is an error in a preset feed, the error will be cancelled in returning so that it will not become a cumulative error.

The invention will be more fully understood by referring to the following detailed specification and claims taken in connection with the appended drawings.

DESCRIPTION OF THE PREFERRED EMBODIMENTS

Figure 1:
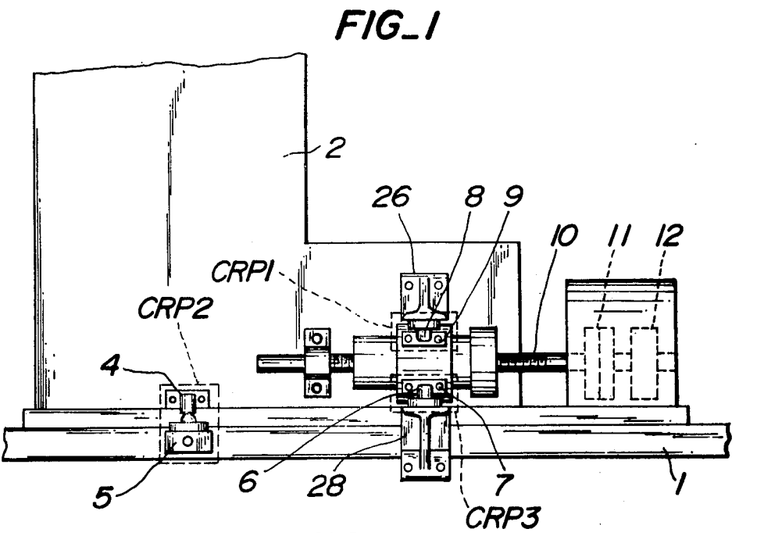
FIG. 1 is a schematic partial elevation of a grinding machine provided with the device according to the invention.
Figure 4:
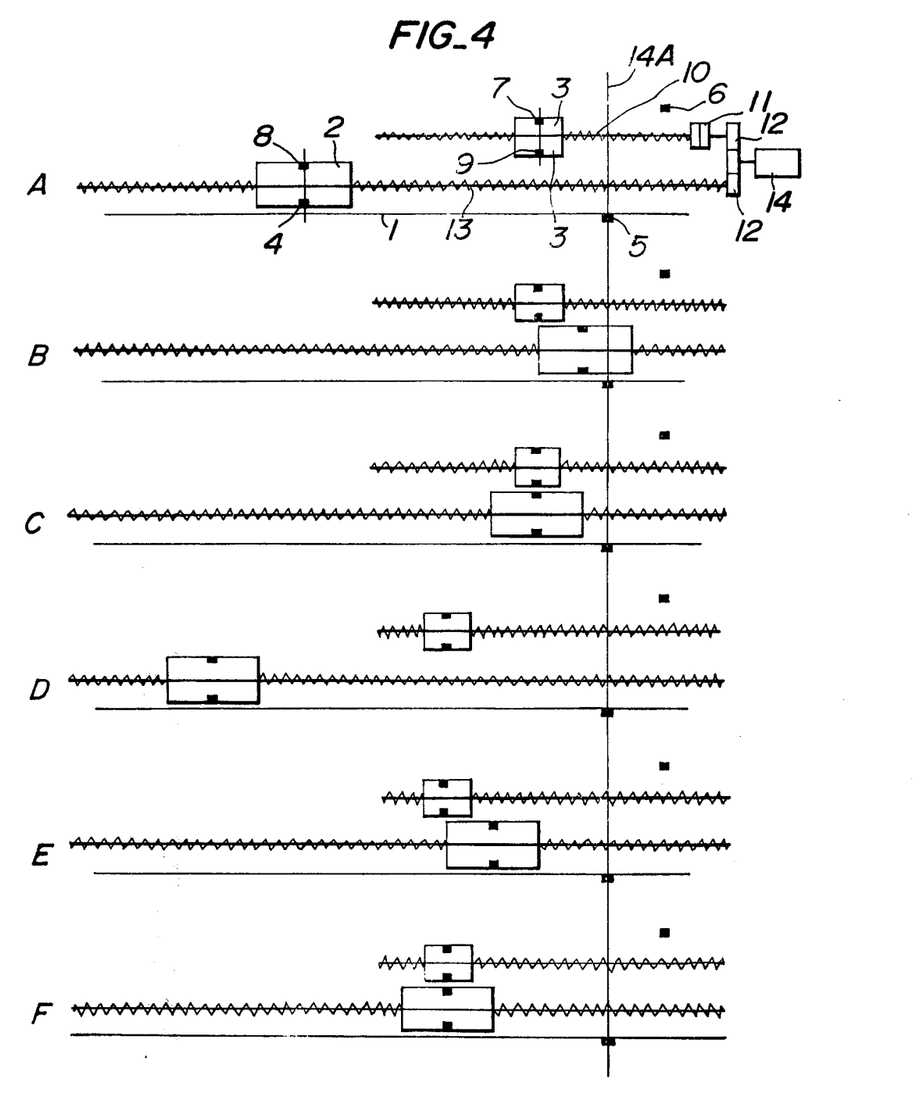
FIG. 4 is a diagrammatical explanatory view of operational relationship between the movable original position mechanism and the column of a machine tool in returning to a moved original position according to the principle of the present invention.
Figure 7:
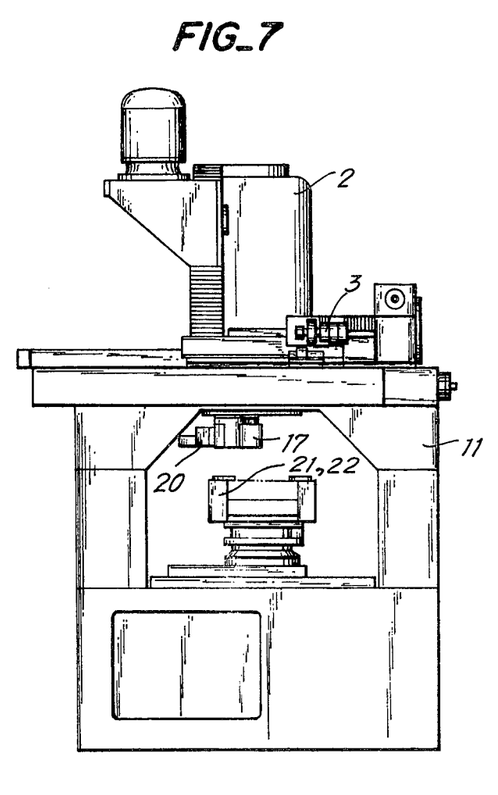
FIG. 7 is an elevation of a typical grinding machine equipped with the device according to the invention.
Figure 9:
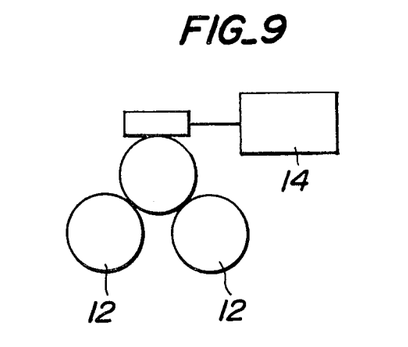
FIG. 9 is a diagrammatical explanatory view of a pulse motor and gears associated therewith used in the preferred embodiment of the invention.

Referring now to FIGS. 1, 4 and 9, a column 2 is arranged on a bed 1 of a machine tool such as a grinding machine for example as shown in FIG. 7 driven in forward and backward directions through gears 12 and a ball screw 13 by means of a pulse motor 14.

A movable original position mechanism 3 (schematically shown in FIG. 4) is incorporated in the column, which is driven in forward and backward directions through gears 12, a magnetic clutch 11 and a ball screw 10 by means of the pulse motor 14.

A magnetic switch CRP2 for detecting an original position is provided on the column 2, of which sensor 4 is brought into opposition to a magnet member 5 of a magnetic switch CRP2 mounted on the bed 1 when the column moves along the bed in forward and backward directions.

A magnetic switch CRP1 for detecting a movable original position is also provided on the column 2 though a mounting plate 26, of which sensor 8 is brought into opposition to a magnet member 9 of a magnetic switch CRP1 mounted on the movable original position mechanism 3 when it and the column 2 moves by means of the screws 10 and 13.

A magnetic switch CRP3 for detecting a stop position of the movable original position is provided on the bed through a mounting plate 28, of which sensor 6 is brought into opposition to a magnet member 7 of a magnetic switch CRP3 mounted on the movable original position mechanism 3 when the magnetic member 7 moves by means of the ball screw 10.

The magnetic clutch 11 serves to transmit the driving force of the pulse motor 14 to the ball screw 10 when receiving signals for dressing or truing or returning to an original position to change grinding wheels or when switched to manual quick feed. The ball screw is locked against rotation when the magnetic clutch 11 is deenergized.

Figure 8:
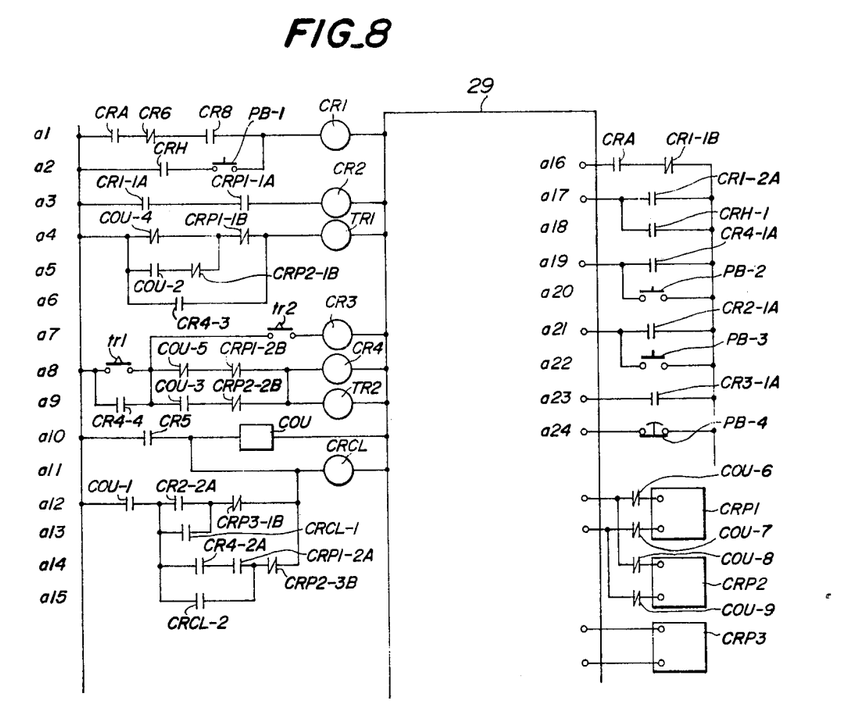
FIG. 8 is a circuit schematic diagram used in the preferred embodiment of the invention.

Referring to FIG. 8 showing a control circuit for the device according to the invention, which circuit comprises a relay contact CRA operative when a selector switch is switched into an automatic control position and a relay contact CRH operative when the selector switch is switched into a manual control position, counters COU for counting times of dressing or truing, a supplemental normal feed timer TR1, a supplemental return deceleration timer TR2, a supplemental return relay CR1, a backward feed relay CR2, a deceleration relay CR3, a forward feed relay CR4, a dressing time relay contact CR5, a door opening relay contact CR6, an automatic sequence completion relay contact CR8, an original or moved original return instruction push button PB-1, a manual forward feed push button PB-2, a manual backward feed push button PB-3, an emergency stop push button PB-4, a magnetic clutch relay CRCL and numerical control means 29.

Figure 5:
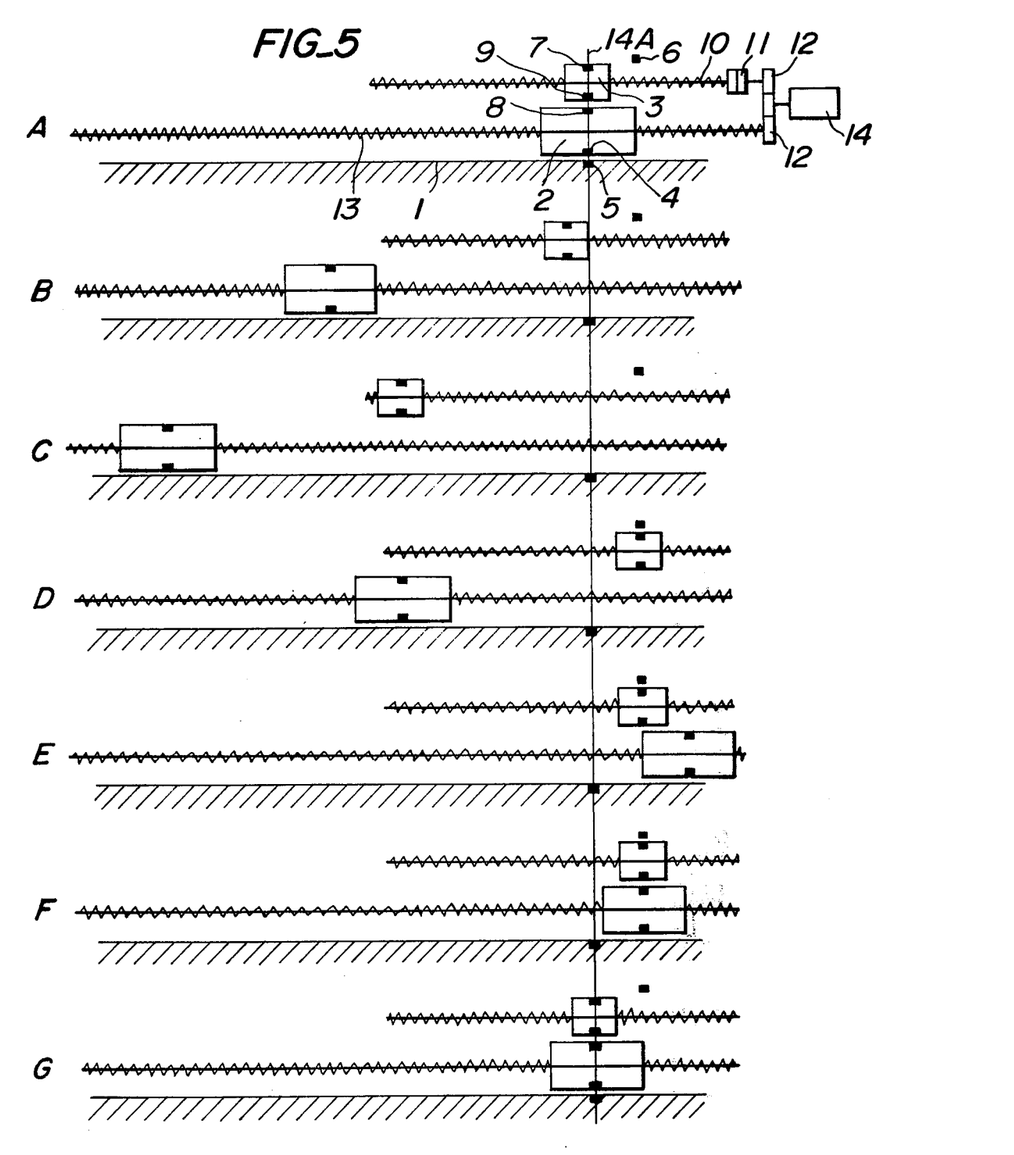
FIG. 5 is a diagrammatical explanatory view of operational relationship between the movable original position mechanism and the column of the machine tool in returning to an original position according to the principle of the present invention.
Figure 6:
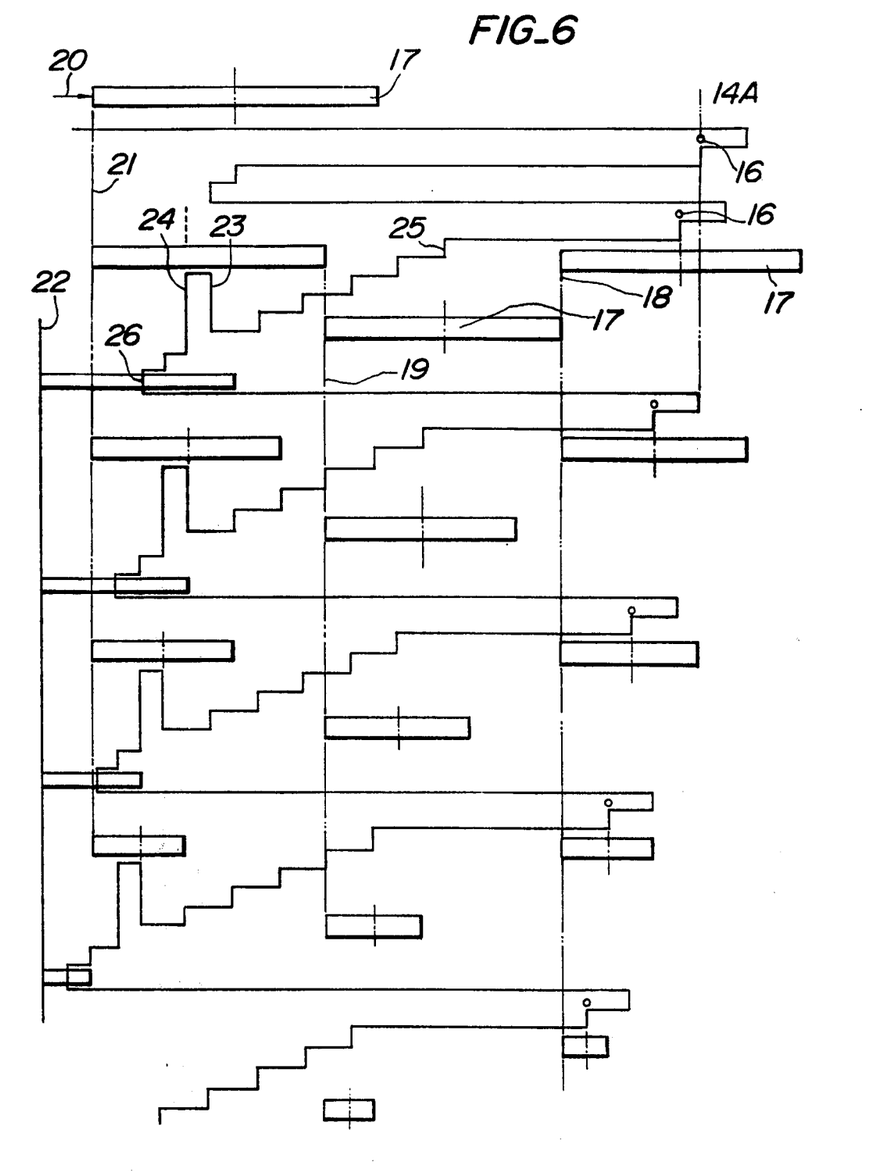
FIG. 6 is a diagrammatical explanatory view of relationship between a work and a grinding wheel which progressively reduces its diameter.

At the time when a grinding wheel 17 is newly mounted in place in substitution for a used wheel the movable original position mechanism 3 are at an original position 14A as shown in FIGS. 5 and 6. After completion of quick feed, or rough or medium grinding, the wheel 17 is raised to an upper position where it is in contact with a diamond cutter 20 so that it is dressed with a preset or desired amount while the axis of the wheel moves from a position 23 to 24. At the same time the movable original position mechanism 3, which has assumed the original position 14A, moves to a new or moved original position a distance equal to the movement during the dressing of the axis of the wheel 17 and hence the column 2 in the forward direction thereof.

After completion of dressing operation, the wheel 17 is lowered to be in contact with the ground surface 21 which has been subjected to the medium grinding so that it continues a finish grinding until sparking out.

Every time the wheel 17 is dressed or trued, its diameter becomes smaller progressively. However, the movable original position mechanism 3 is adapted to move in the forward direction each time the wheel is trued or dressed, so that the moved original position of the mechanism 3 is used as a new original position to keep constant a relationship between the surface 18 of the wheel at the moved original position, the surface 19 of the wheel which will be about to be in contact with the work after the quick feed, the surface 21 of the work after the wheel is trued or dressed and the surface 22 of the work subjected to be finish grinding until sparking out, regardless of the variaion in diameter of the wheel.

Figure 2:
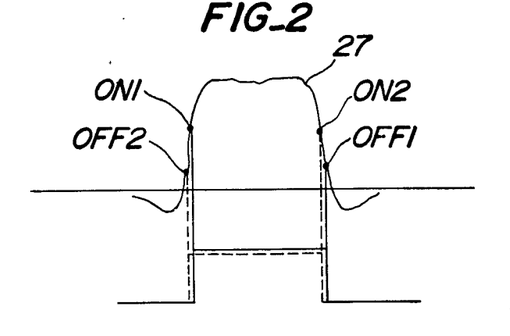
FIG. 2 is an operational diagram of a magnetic switch used in the device according to the invention.
Figure 3:
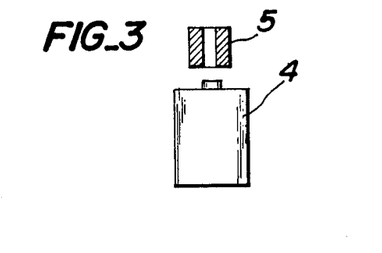
FIG. 3 is a schematic elevation of the magnetic switch shown in FIG. 2.

Referring to FIGS. 2 and 3, the sensor 4 of the magnetic switch moves back and forth with respect to the magnet member 5 to provide an output voltage curve 27. If the member 5 moves relatively to the sensor 4 from the right to the left as viewed in FIG. 3, the sensor is energized when the output voltage reaches a determined value at ON2 in the curve shown in FIG. 2 and is deenergized when it reaches a value less than a determined value of OFF2. In the same manner, when the member 5 moves relatively to the sensor 4 from the left to the right, the sensor is energized on ON1 and deenergized at OFF1. Accordingly, "ON" and "OFF" points are on both sides of the output voltage curve 27, these points being offset due to a hysteresis resulting from the difference in moving directions of the member 5. The other magnet members and sensors used in the apparatus according to the invention also operate in the same manner.

In order to cancel the back-lash in moving parts, the wheel or column should be returned from an advanced position opposite to the original position to a further position beyond it, so that the wheel is always advanced in one direction. As shown in FIG. 2, the position OFF1 is offset a determined distance from the position ON2 in a determined direction (to the right as viewed in FIG. 2) due to the hysteresis. According to the invention a backward feed stop signal is produced when the output voltage is the value at OFF1 and a forward feed stop signal is produced at ON2 to cancel the back-lash in moving parts.

The wheel or column is returned to the moved original position in the following manner. In FIGS. 4 and 6, the column 2 moves toward the moved original position according to a moved original position return signal after a completion of finish grinding and sparking out so that the sensor 8 of the magnetic switch CRP1 on the column 2 passes (from the left to the right as viewed in FIG. 4) beside the magnet member 9 on the mechanism 3 and in the manner described above the column 2 decelerates and stops at a position (FIG. 4B) corresponding to the OFF1, after which it moves forward very slowly in an opposite direction and stops at a position (FIG. 4C) corresponding to the ON2 when the returning to the moved original position is completed.

It will be explained in more detail referring to FIGS. 4, 6 and 8. When the finishing grinding and sparking out have been completed, the numerical control means 29 generates an automatic sequence completion signal to close the automatic sequence completion relay contact CR8 at an address a1 in FIG. 8 so that the supplemental return relay CR1 is energized, and the backward feed relay CR2 is also energized by closing a first normally opened contact CR1-1A of the supplemental return relay CR1 at an address a3 and a first normally opened contact CRP1-1A of the magnetic switch CRP1 at an address a3 which has been "ON" in preceding returning, with the result that a first normally opened contact CR2-1A at an address a21 is closed to supply a signal to the NC means 29 for moving the column 2 backward and at the same time a first normally closed contact CR1-1B at an address a16 is opened to cut off the automatic operation of NC means 29 which is then switched in manual operation by closing a second normally opened contact CR1-2A at an address a17.

On the one hand the first normally opened contact CR2-1A at the address a21 is held closed by the operation of the backward feed relay CR2 so that the column 2 moves rapidly to the moved original position by the manual operation of NC means 29 for the backward movement of the column 2. At this time the counter COU has not yet counted a dressing so that the magnetic clutch 11 is not energized and the movable original position mechanism 3 remains stationary. The sensor 8 on the column 2 passes beside the magnet member 9 mounted on the mechanism 3, that is to say from the left to the right as the output voltage curve 27 shown in a solid line in FIG. 2, so that the magnetic switch CRP1 is opened at the moment corresponding to the OFF1 to open the first normally opened contact CRP1-1A of the magnetic switch CRP1 as shown at the address a3 thereby releasing the backward feed relay CR2 to stop the column 2.

Referring back to FIG. 2, it should be noted that owing to the hysteresis characteristic of the magnetic switch CRP1 at its "ON" and "OFF" operations the point OFF1 is shifted to the right from the actually moved original position ON2, the shifted amount of which can be used for cancelling the back-lash according to the invention.

On the other hand when the magnetic switch CRP1 is switched off, a first normally closed contact CRP1-1B at an address a4 is closed to operate the supplemental forward feed timer TR1, and after a preset period of time thereof a contact tr1 at an address a8 is closed to operate the forward feed relay CR4 and to close a first normally opened contact CR4-1A at an address a19 thereby supplying a forward feed signal to the NC means 29. At the same time the supplemental return deceleration timer TR2 operates and after a preset period of time thereof a contact tr2 at an address a7 is closed to operate the deceleration relay CR3 for generating a deceleration signal so that the column 2 is decelerated to a very slow rate by the deceleration signal derived from the deceleration relay. In this manner the column 2 moves again very slowly in the forward direction (from the right to the left as viewed in FIG. 4) so that the sensor 8 is brought into opposition to the magnet member 9 as shown at C in FIG. 4 to operate the magnetic switch CRP1 again thereby opening a second normally closed contact CRP1-2B at the address a8 to releasing the forward feed relay CR4, with the result that the column 2, which has moved at very slow rate, stops at its moved original position in opposition to the mechanism 3 (FIG. 4C).

The column is returned to the original position in the following manner. When it is desired to replace a grinding wheel which has reduced its diameter due to repeated truing or dressing, the column 2 returns to the original position after the counter COU has counted the change of wheel.

Referring to FIG. 5, when finish grinding and spark out have been completed and dressing is counted up, a signal for returning the column to the original position is supplied to the drive so that the column 2 moves at a high speed toward the original position. At the same time the magnetic clutch 11 is energized to move the movable original position mechanism 3 at a high speed in a direction the same as that of the travel of the column (FIG. 5C) so that the magnet member 7 on the mechanism 3 is brought into opposition to the sensor 6 arranged on the right side of the original position 14A as viewed in FIG. 5A, whereby the magnetic clutch 11 is deenergized at the position ON1 in FIG. 2 to stop the mechanism 3 but the column 2 continues to its movement beyond the original position (FIG. 5D) and then decelerates and stops at position corresponding to the position OFF1 (FIG. 5E) resulting from the relationship between the sensor 8 and magnet member 9. Then the column 2 moves forward at a very low rate and the magnetic clutch 11 is again energized at a position corresponding to the position ON2 in FIG. 2 resulting from the relationship between the sensor 8 and magnet member 9, so that the mechanism 3 and column 2 move in unison toward the original position 14A (FIG. 5F) and then stop together at the original position 14A (FIG. 5G) corresponding to the position ON2 in FIG. 2 resulting from the relationship between the sensor 4 on the column 2 and the magnet member 5 on the bed 1.

It will be explained in more detail referring to FIGS. 2, 5 and 8. On completion of the automatic sequence the automatic sequence completion relay contact CR8 at the address a1 is closed to operate the supplemental return relay CR1 and backward feed relay CR2 so that the column starts to travel backward at a high rate. In case of completion of counting up of the counter COU, a normally opened contact COU-1 at an address a12 is closed to operate the magnetic clutch relay CRCL with the aid of a second normally opened contact CR2-2A and a first normally closed contact CRP3-1B of the magnetic switch CRP3 so that the magnetic clutch 11 as shown in FIG. 5 is energized to move backward the mechanism 3 together with the column 2 at a high rate (FIG. 5C). The mechanism 3 moves beyond the original position 14A to a position where the magnet member 7 on the mechanism is brought into opposition to the sensor 6 on the bed 1, so that the magnetic switch CRP3 is switched on corresponding to the position ON1 in FIG. 2 to open the first normal closed contact CRP3-1B at the address a12, as a result of which the magnetic clutch 11 is deenergized so that the movable original position mechanism 3 stops at the fixed position of the sensor 6 as shown in FIG. 5D. On the other hand the column 2 continues to move backward until it reaches the position as shown in FIG. 5E where the magnetic switch CRP1 is deenergized at the position OFF1 in FIG. 2 in the relationship between the sensor 8 on the column 2 and the magnet member 9 on the mechanism 3 which has been stationary thereby closing the first normally opened contact CRP1-1A at the address a3 so that the column 2, which has traveled backward at a high rate, decelerates and stops at the position shown in FIG. 5E. The supplemental forward feed timer TR1 is actuated by the operation of a normally opened contact COU-2 of the counter COU at an address a5, a first normally closed contact CRP2-1B of the magnetic switch CRP2 and the first normally closed contact CRP1-1B at the address a4 and after a set time of the timer TR1 the contact tr1 at the address a8 is closed to operate the forward feed relay CR4 by the operation of a normally opened contact COU3 of the counter COU and a second normally closed contact CRP2-2B at an address a9 so that the first normally opened contact CR4-1A at the address $a19$ supplied an instruction of forward feed to the NC means 29. At the same time a supplemental return deceleration timer TR2 is operated and after a set time thereof the contact tr2 at the address $a7$ is closed to operate the deceleration relay CR3 so that a first normally opened contact CR3-1A at an address $a23$ supply a deceleration information to the NC means 29, whereby the column 2 moves at a very low rate forward or to the left as viewed in FIG. 5F, so that the sensor 8 and magnet member 9 are brought into the relationship at the position ON2 as shown in FIG. 2. At this moment the magnetic switch CRP1 is actuated and the magnetic clutch relay CRCL is operated by the contact COU-1 at the address $a12$ and a second normally opened contact CR4-2A, a second normally opened contact CRP1-2A and third normally closed contact CRP2-3B at an address $a14$, so that the magnetic clutch 11 is energized and the column 2 and movable original position mechanism 3 travel in unison forward or to the left at a very low rate as shown in FIG. 5F. As the result the sensor 4 and magnet member 5 are brought into the relationship corresponding to the point ON2 in FIG. 2 as shown in FIG. 5G to actuate the magnetic switch CRP2 and to open the second normally closed contact CRP2-2B at the address $a9$ so that the forward feed relay CR4 are released to stop the forward movement of the column 2 and mechanism 3 which return together to the original position 14A. Moreover, if the movable original position return instruction push button PB-1 at the address $a2$ is pressed, the column 2 and mechanism 3 return automatically to the movable original position as described above, and after the counter COU has counted up, if the push button PB-1 is pressed, the column 2 and mechanism 3 also return automatically to the original position.

Following effects can be accomplished by the device according to the invention.

A relationship between the surfaces of the work and tool or grinding wheel is held contact regardless of dressing or truing operations without any extension of cycle times due to reductions in size of the tool.

The hysteresis of magnetic switches at "ON" and "OFF" positions is utilized for removal of back-lash of moving parts so that the returning to an original position can be carried out with an accuracy of ±0.001 mm without using any arithmetic unit for compensation.

Even if an electric current is stopped in working operation of a machine for an emergency or unintentional reason, the return to an original or moved original position can be effected with ease and the working operation can be again carried out when an electric current is supplied.

If there is an error in a preset feed, the error will be cancelled in returning so that it will not become a cumulative error.

A preparatory plan and positioning of a work or tool are very simplified by the movable original position mechanism. Once an original position is set according to a maximum diameter of grinding wheels to be used and required original positions are determined according to a maximum diameter of a wheel to be actually used which values are preset, after which the mode is switched into a quick feed and a starting push button is pressed so that the movable original position mechanism 3 can be moved to positions most suitable for the diameters which are used as reference original positions.

When using a diamond wheel which needs not be dressed every time, the movable original position mechanism does not move by an operation that the dressing means and its control are brought in inoperative. When a used grinding wheel is replaced by a new wheel different in diameter, after the column has been returned to the original position by pressing the original position return push button, a quick feed is newly preset and the machine is started to operate whereby a new reference or original position is automatically set. In this manner a reference or original position is set with ease and high accuracy by presetting feeds by the operation of digital switches according to the diameter of the grinding wheel to be actually used.

It is further understood by those skilled in the art that the foregoing description is a preferred embodiment of the disclosed device and that various changes and modifications may be made in the invention without departing from the spirit and scope thereof.

What is claimed is:

1. A cutting feed starting position control device for numerically controlled machine tools comprising a stationary bed, a tool carrying column movable thereon, means for dressing said tool after it has become blunt, a movable original position mechanism which can keep its moved position in a constant positional relation to said column to compensate the dimensional difference resulting from said dressing, a magnetic switch means consisting of a first and second part such as a magnetic body and a sensor, said first part mounted on said mechanism and the second part mounted on said column whereby said column can be returned to the position of said mechanism by utilizing a difference between output voltage curves of said switch means resulting from a difference in direction of movement of said column due to hysteresis of said switch means to cancel back-lash between moving parts, second magnetic switch means consisting of a third and fourth part such as a magnetic body and a sensor, said third part mounted on said bed and the fourth part mounted on said mechanism whereby said mechanism can be returned to the position of said third part, and third magnetic switch means consisting of a fifth and sixth part such as a magnetic body and a sensor, said fifth part mounted on said bed and the sixth part mounted on said column whereby after said column has been returned over said fifth part and said mechanism located in the position of said fifth part, said column can be moved forwardly with said mechanism and then can be stopped at the feed starting original position.

2. A cutting feed starting position control device as set forth in claim 1, wherein said magnetic switch means parts include a magnetic member and a sensor.

* * * * *